United States Patent [19]

Moumdjian

[11] Patent Number: 5,199,191
[45] Date of Patent: Apr. 6, 1993

[54] ATHLETIC SHOE WITH INFLATABLE MOBILE INNER SOLE

[76] Inventor: Armenak Moumdjian, Nor Marash Street, Bourj-Hammud, Beirut, Lebanon

[21] Appl. No.: 710,769

[22] Filed: Jun. 4, 1991

Related U.S. Application Data

[60] Continuation-in-part of Ser. No. 608,570, Nov. 2, 1990, Pat. No. 5,112,560, which is a division of Ser. No. 295,438, Jan. 10, 1989, abandoned, which is a division of Ser. No. 74,765, Jul. 17, 1987, Pat. No. 4,845,861.

[51] Int. Cl.⁵ .............. A43B 13/18; A43B 13/20; A43B 13/00
[52] U.S. Cl. .............. 36/28; 36/29; 36/25 R
[58] Field of Search .......... 36/25 R, 28, 29, 30 R, 36/35 B, 3 B, 32 R; 264/244, 516

[56] References Cited

U.S. PATENT DOCUMENTS

| 1,310,437 | 7/1919 | Roberts . | |
|---|---|---|---|
| 1,575,388 | 3/1926 | Roberts . | |
| 3,813,201 | 5/1974 | Frederick | 249/105 |
| 3,825,457 | 7/1974 | Holroyd et al. . | |
| 3,933,967 | 1/1976 | Taylor | 264/248 |
| 4,217,081 | 8/1980 | Rooney | 249/83 |
| 4,224,276 | 9/1980 | Gallizia | 264/571 |
| 4,372,525 | 2/1983 | Uhlig | 249/102 |

FOREIGN PATENT DOCUMENTS

| 2256945 | 5/1973 | Fed. Rep. of Germany . |
| 3335442 | 9/1983 | Fed. Rep. of Germany . |
| 60166414 | 2/1984 | Japan . |

Primary Examiner—Paul T. Sewell
Assistant Examiner—M. D. Patterson
Attorney, Agent, or Firm—Herbert Dubno

[57] ABSTRACT

An athletic shoe has an air pressurizable inner sole received in a compartment between the sole and the upper so as to be free to move therein except for the location at which the valve formation of the inner sole passes through the wall of this compartment.

20 Claims, 7 Drawing Sheets

ATHLETIC SHOE WITH INFLATABLE MOBILE INNER SOLE

CROSS REFERENCE TO RELATED APPLICATIONS

This application is a continuation-in-part of my copending application Ser. No. 07/608,750 filed 2 Nov. 1990 (now U.S. Pat. No. 5,112,560) as a division of Ser. No. 07,/295,438 filed 10 Jan. 1989 (now abandoned) which was a division of Ser. No. 07/074,765 filed 17 Jul. 1987 (now U.S. Pat. No. 4,845,861).

FIELD OF THE INVENTION

My present invention relates to an athletic shoe having an inner sole which can be pressurized by a fluid, usually air, and which is mobile within the shoe. The invention also relates to improvements in the inner sole, to an improved method of making the shoe and to apparatus for use in the method.

BACKGROUND OF THE INVENTION

As will be apparent from my aforementioned patent, the art cited therein and especially U.S. Pat. No. 4,722,131, it is known to provide a fluid pressurizable sole structure which can be referred to as an air cushion shoe sole and which is usually molded with the outsole and/or the upper and can be embedded or otherwise secured over the greater part of the area of the sole to the structures between which the air cushion cells are sandwiched.

Various configurations have been developed for air cushion cells as well. I have discovered, after considerable research in this field that prior shoemaking techniques for the fabrication of athletic shoes have resulted in products which are less than satisfactory both with the ability to highly pressurize the air cushion structure, and the comfort of the shoe. In particular I have found, most surprisingly, that the bonding of the air cushion structure or the molding thereof within the system formed by the outsole and the shoe upper have created significant problems and drawbacks and that prior configurations of the air cushion structure have interfered with comfort and caused problems with respect to the stability of the shoe.

OBJECTS OF THE INVENTION

Accordingly, it is the principal object of the present invention to provide an improved athletic shoe with an air cushion insole of variable pressurization which will be free from the drawbacks described above.

Another object of this invention is to provide an improved method of making an athletic shoe which is more comfortable and can more readily be pressurized at a wide range of pressures than prior art athletic shoes.

Still another object of the invention is to provide an improved inner sole structure for an athletic shoe.

Still a further object of my invention is to provide improved apparatus for making an athletic shoe.

Finally, it is an object of the invention to improve upon the article, method and apparatus disclosed in my aforementioned copending application and to thereby extend the principles set forth therein.

SUMMARY OF THE INVENTION

As noted, I have discovered that one of the major problems in athletic shoes utilizing an air cushion principle is that the air cushion inner sole is formed unitarily with an outsole or upper or both by a molding operation or is bonded thereto or is otherwise prevented from free mobility within the shoe, thereby causing many of the problems associated with earlier athletic shoes having an inflatable air cushion structure.

According to the invention, therefore, an athletic shoe can comprise:

an athletic shoe sole;

an athletic shoe upper affixed to the sole over a periphery thereof, the upper and the sole defining a compartment between them extending substantially a full length and width of the sole, the compartment having a peripheral wall;

a hollow flexible inner sole received in the compartment and having a heel portion, a shank portion, a foot-ball portion and a toe portion, the inner sole further having a flexible valve formation extending laterally thereof through the wall and forming the only location at which the inner sole is anchored in the compartment, the inner sole being freely movable within the compartment except at the formation; and at least one checkvalve in the valve formation permitting fluid pressurization of an interior of the inner sole.

Essential to this construction, therefore, is the compartment extending the full length of the shoe and defined by the sole and the upper by peripherally attaching the upper to the sole so that the inner sole formed with the cells which can be pressurized through the valve has free mobility within the compartment and is retained exclusively by a valve formation passing through the peripheral wall of this compartment.

Surprisingly, this configuration allows extremely high pressures to be built up while maintaining the comfort of the shoe.

According to a feature of the invention, the inner sole is formed with transverse hinge webs interconnecting the foot-ball portion and the toe portion, the foot-ball portion and the shank portion, and the heel portion and the shank portion, at least the hinge webs interconnecting the foot-ball portion with the toe portion and the foot-ball portion with the shank portion having passages for fluid communication therebetween.

The inner sole can be provided with two checkvalves, one of which can communicate with the heel portion while the other can communicate with the shank portion, the foot-ball portion and the toe portion which communicate with one another as described. Still other checkvalves may be provided if it is desired to separately pressurize any of these portions. In all cases it is preferred, however, to have the plurality of checkvalves extend through the same tubular portion of the inner sole constituting the single formation traversing the peripheral wall of the compartment and retaining the inner sole within the compartment. If a single checkvalve is provided, of course, the heel portion communicates with the shank portion.

The shank portion should be subdivided transversely into at least two longitudinal sections interconnected by a flexible longitudinal web having a passage for fluid communication between the sections. Three such sections can be provided as separated by two longitudinal webs formed with respective passages.

Advantageously, the inner sole is formed from two halves molded from an elastomeric material and bonded in a median plane of the inner sole.

Each of the halves can be formed with a single central depression on the heel portion defined by an inwardly extending hollow post of the material, the posts being bonded together in the median plane. Each of the halves can be formed, moreover, on a lateral wall of the inner sole with a semicylindrical casing, the two casings receiving a valve-housing tube between them.

A method of making an athletic shoe can comprise the steps of:

forming a hollow flexible inner sole having a heel portion, a shank portion, a foot-ball portion and a toe portion;

retaining the inner sole in a compartment formed by attaching an athletic shoe upper to an athletic shoe sole along a peripheral wall of the compartment by introducing a flexible valve formation laterally through the wall and forming the only location at which the inner sole is anchored in the compartment, the inner sole being freely movable within the compartment except at the formation; and thereafter inserting at least one checkvalve in the valve formation permitting fluid pressurization of an interior of the inner sole.

It has been found to be important to provide the machine which makes the inner sole with a fixed upper mold part and a movable lower mold part and to provide means for laterally shifting a valve housing tube between these mold parts after the intermediate mold part has been withdrawn as described in my aforementioned copending application. The latter means is provided to raise the valve housing tube into the semicylindrical casing formed in the upper half of the inner sole, whereupon the lower half is raised to press the two halves together and fuse the casings to the valve housing tube. Simultaneously, a raw rubber flange can be vulcanized to the casing halves and to the valve housing tube. The valve housing tubes and the casing, after molding, are sufficiently flexible to be inserted through a wall of the compartment, advantageously formed in a sole liner on the exterior of which the outsole can be provided. The outsole can have an upwardly extending tab likewise formed with a hole through which the valve formation can be passed, whereupon the checkvalve is inserted in this formation to render it relatively rigid and prevent inward retraction of the formation.

According to a feature of the method aspect of the invention, as the mold is closed to press the two halves of the inner sole together and allow vulcanization of them together, a slight air pressure is applied through the valve housing tube and the valve formation. After the mold is fully closed, full pressure can be supplied before the mold is opened, the interior of the inner sole is vented to atmospheric pressure through the tube which, in this state, is free from the valve member inserted subsequently after assembly of the inner sole to the outer sole and the sole lining as described.

Thus in the method of the invention, the inner sole is formed from two halves molded from an elastomeric material and bonded in a median plane of the inner sole by simultaneously molding an upper half between an upper mold part stationary on a molding machine and an intermediate mold part thereof, and a lower half in alignment with the upper half between a vertically movable lower mold part and the intermediate mold part, withdrawing the intermediate mold part from between the upper and lower mold parts, laterally introducing a valve-housing tube between the halves and raising the valve-housing tube into the casing on the half on the upper part, raising the lower part to press the halves together and close the casings on the valve-housing tube, lightly pressurizing an interior of the inner sole as the halves are pressed together, fully pressurizing the inner sole and vulcanizing the halves together, and thereafter depressurizing the inner sole to atmospheric pressure through the valve-housing tube and removing the inner sole from the molding machine.

BRIEF DESCRIPTION OF THE DRAWING

The above and other objects, features and advantages of my invention will become more readily apparent from the following description, reference being made to the accompanying highly diagrammatic drawing in which.

SPECIFIC DESCRIPTION

Figure 1:
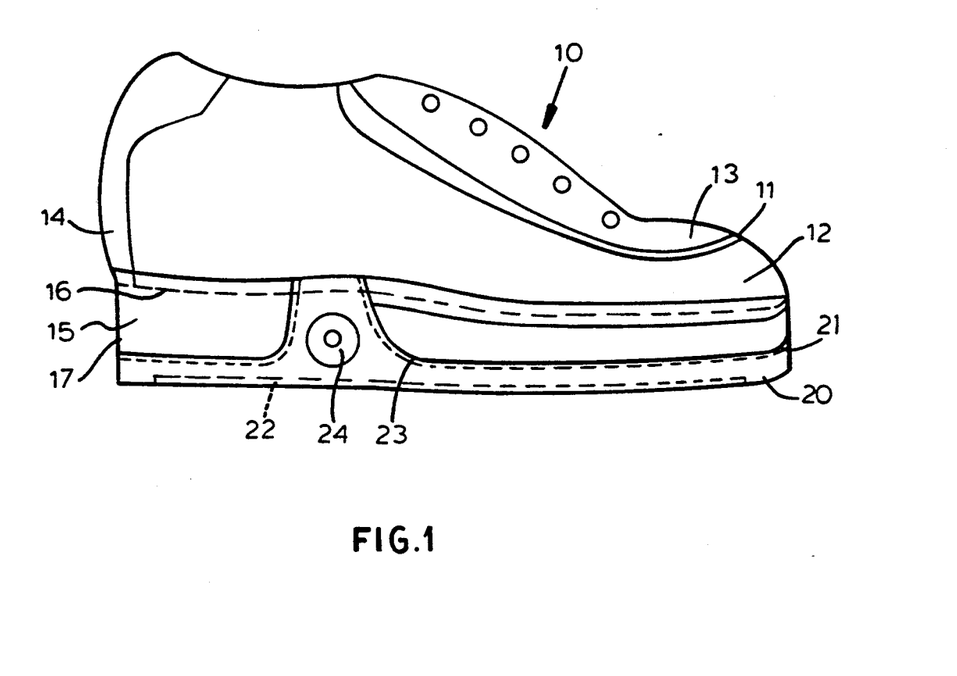
FIG. 1 is a diagrammatic elevational view of the shoe of the invention.

From FIG. 1 it can be seen that an athletic shoe 10, according to the invention, can be formed from an upper 11 having a toe box 12 a vamp 13 and a heel counter 14 as is conventional in athletic shoe design. According to the invention, an apron 15 can be stitched at 16 to a peripheral wall 17 of a compartment 18 (see FIG. 3). That peripheral wall may form part of a sole liner 19 along the exterior of which an outer sole 20 may be applied. The outer sole 20 may be bonded to the liner and/or secured thereto by a stitch seam 21.

Molded within the outer sole 20 may be a thin metal plate 22 extending the full length of the athletic shoe and having a maximum thickness of 0.3 mm. This metal plate may be composed of steel.

As can be seen from FIG. 1, the outer sole 20 is molded with an upstanding lug 23 which is also stitched to the peripheral wall 17 and receives a valve formation 24 on an inner sole 25 received within the compartment 18 and anchored to the remainder of the shoe exclusively by the flexible valve formation 24 which will be described in greater detail in connection with FIGS. 4 through 10.

At this point it suffices to note that the inner sole 25 is not secured within the compartment by any other means and has free mobility in all directions.

Figure 2:
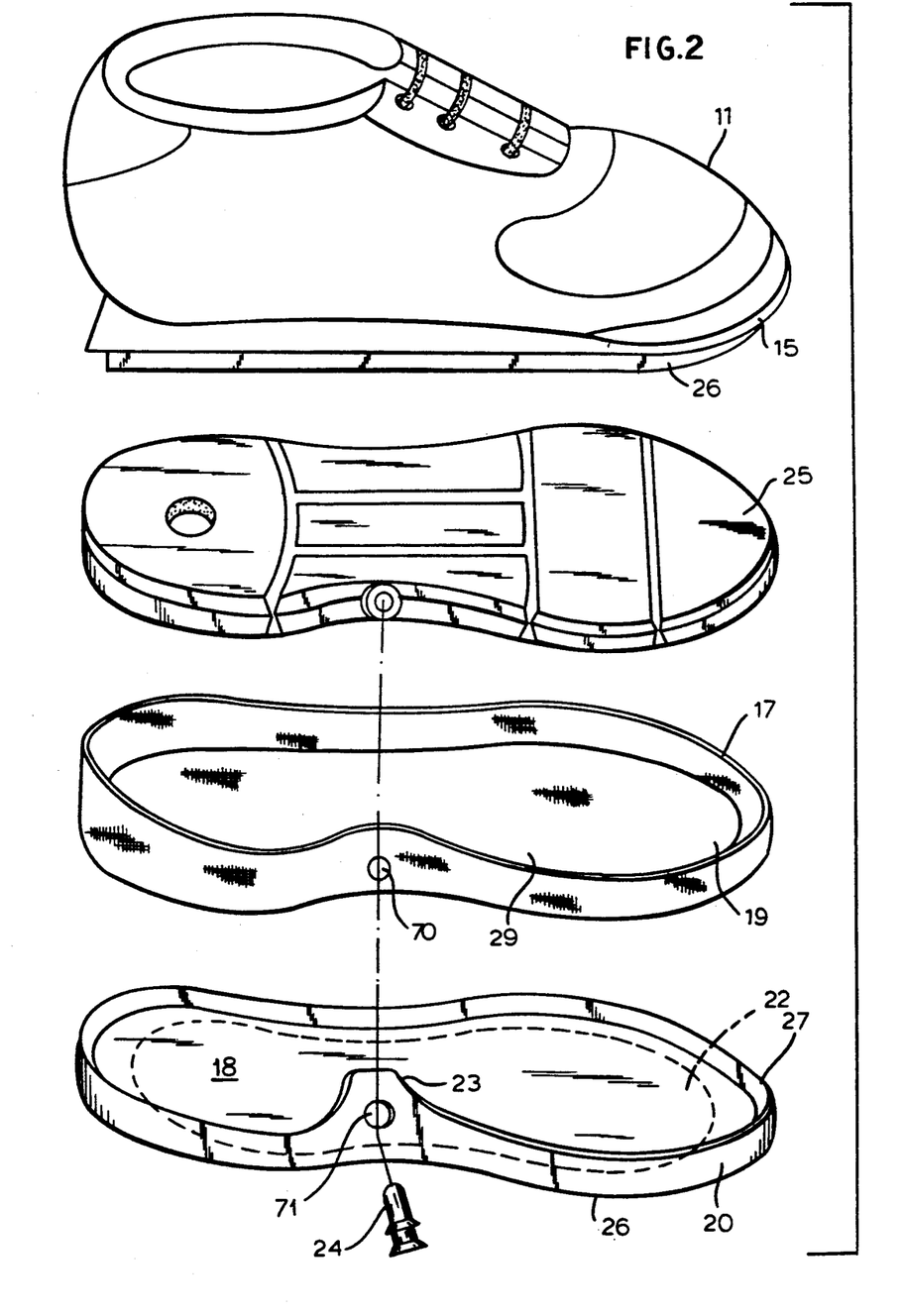
FIG. 2 is an exploded view illustrating the assembly of the shoe.
Figure 3:
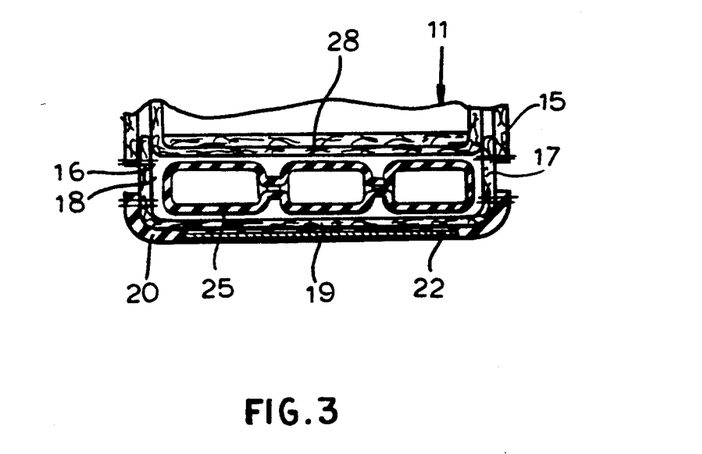
FIG. 3 is a diagrammatic section through part of the shoe.

The assembly of the shoe can be seen from FIGS. 2 and 3. The outsole 20, which can be formed on its underside 26 with the usual embossing to provide secure engagement with the ground or a gymnasium floor and decorative embossing which is common in athletic shoes, has, in addition to the embedded insert 22 as described, a raised rim 27 which can be stitched at 21 to the sole liner 19. The latter is formed unitarily with the peripheral wall 17 and forms the compartment 18 into which the inner sole 25 is inserted. From FIG. 2 the apron 15 which is stitched at 16 to the peripheral wall 17 is also visible as is the bottom 28 of the upper which forms the top wall of the casing 18. Neither the bottom 28 of the upper nor the bottom 29 of the liner 19 is bonded to the inner sole 25 which is, therefore, free to move within the casing.

Figure 4:
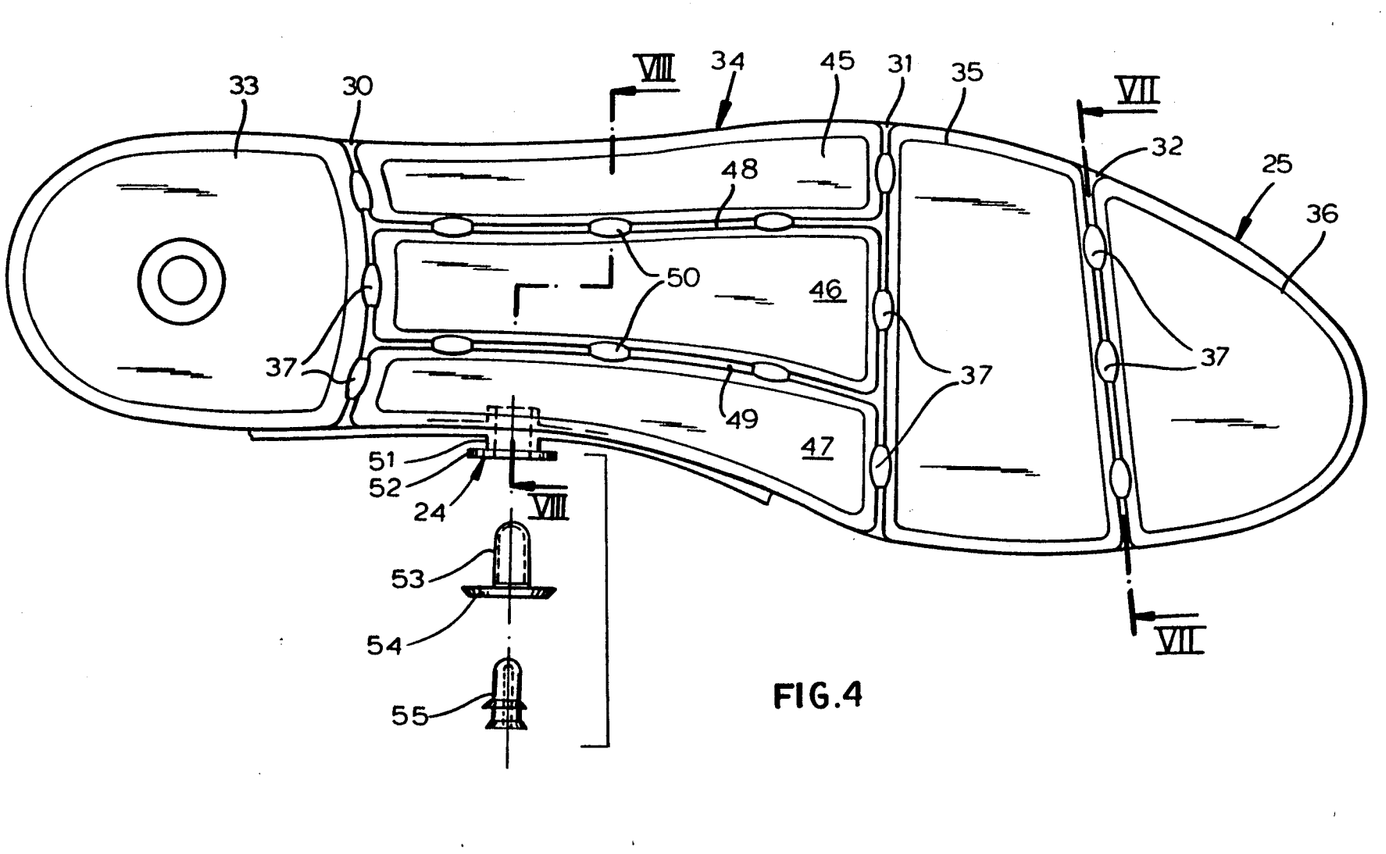
FIG. 4 is a plan view of the inner sole.

As is apparent from FIG. 4, the inner sole 25 is subdivided into four main portions by three transverse webs 30, 31 and 32 forming flexible hinges between these portions.

These portions are a heel portion 33, a shank portion 34, a foot-ball or metatarsal portion 35 and a toe portion 36. In the embodiment illustrated bores 37 for example interconnect these portions so that all can be pressurized through a valve as will be described in greater detail below.

Figure 5:
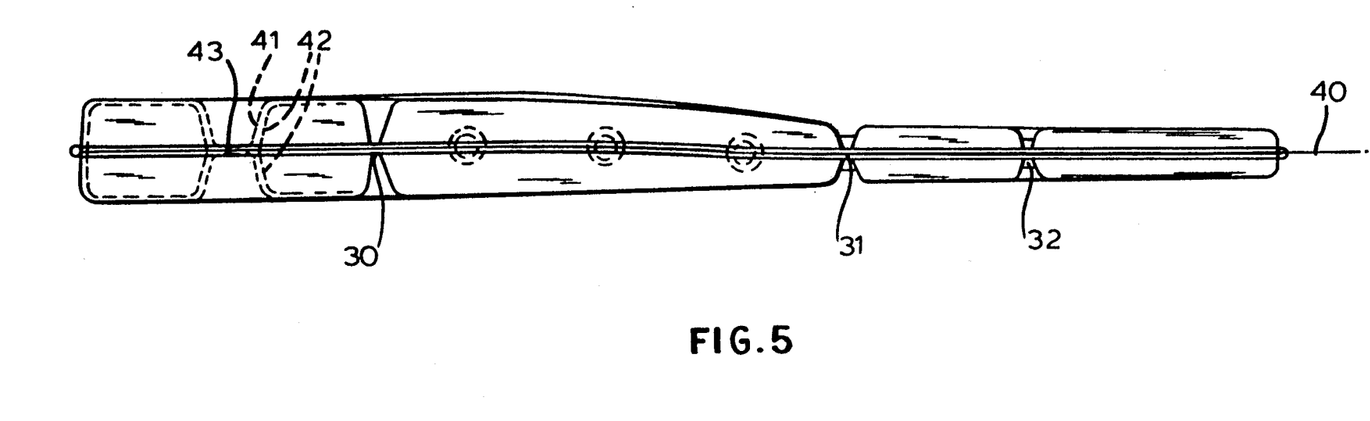
FIG. 5 is a side view thereof.
Figure 6:
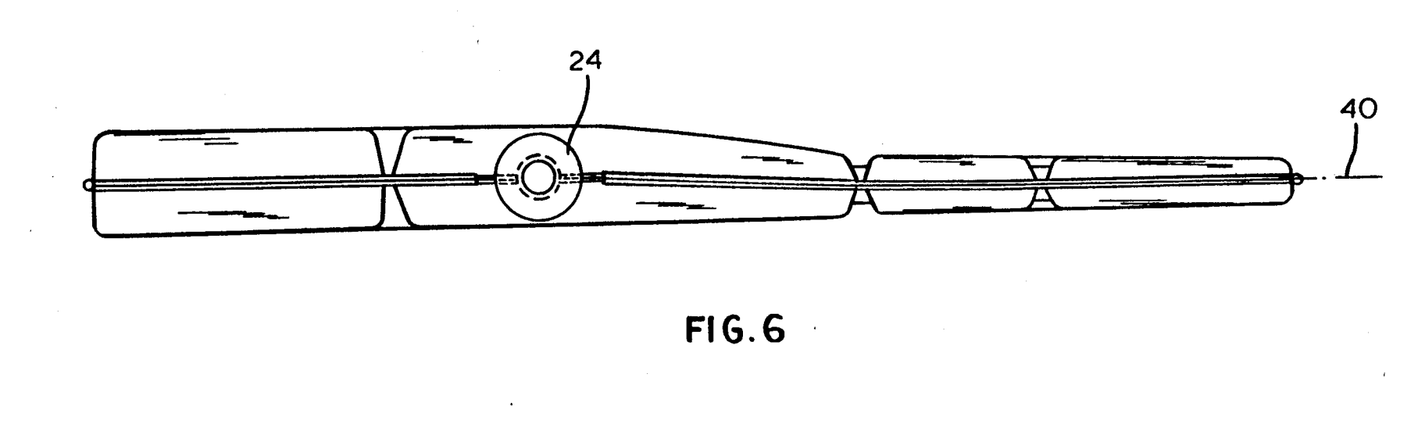
FIG. 6 is an opposite side view thereof.
Figure 7:
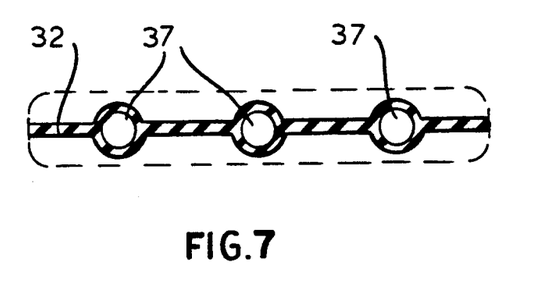
FIG. 7 is a section taken along the line VII—VII of FIG. 4.

The inner sole has a wedge configuration in the sense that the upper and lower surfaces converge toward one another and toward a median plane 40 as is best seen in FIGS. 5 and 6.

The heel portion 33 is provided centrally with a single recess 41 defined by a pair of posts 42 which meet in the median plane 40 and are bonded together at 43. These frustoconical posts ensure that, upon pressurization of the heel portion with compressed air, the heel portion will bulge in a uniform annulus around the recess 41.

The shank portion 34 is formed with three longitudinal sections 45, 46 and 47 separated by longitudinal webs 48 and 49 having passages 50 communicating between them. It is possible to provide only two such longitudinal sections separated by a single longitudinal web.

The inner sole is formed with the tubular formation 24 which is constituted by a molded cylindrical casing 51 on the internal lateral wall of the inner sole provided with a flange 52 and receiving a valve housing tube 53 to which a disk 54 of raw rubber is vulcanized in the vulcanization process to provide a finish flange visible on the outside of the shoe (see FIG. 1). Once the tube 53 is fused in place and the flange 54 is vulcanized thereto, the inner sole can be inserted into the shoe as described and a conventional valve plug 55 can be faced into the tube 53. The valve plug 55 which is identical to valve plugs used in footballs, soccer balls and the like, allows pressurization of the inner sole utilizing a ball-inflation needle to any pressure and then permits retraction of the needle whereby the valve 55 seals the interior of the inner sole against the escape of air.

Figure 8:
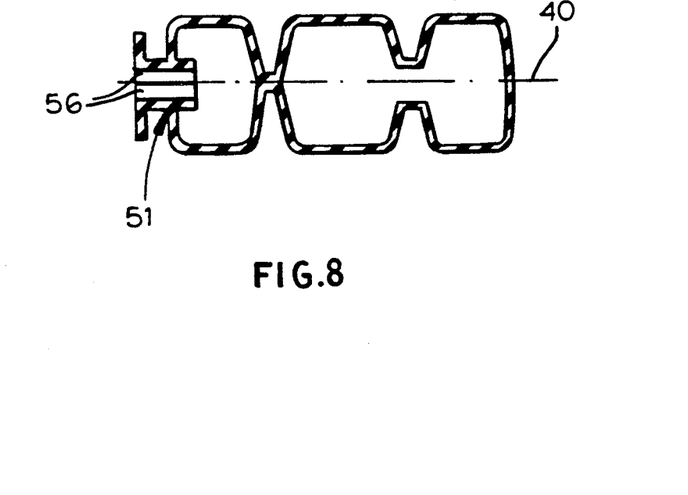
FIG. 8 is a section along the line VIII—VIII of FIG. 7.
Figure 9:
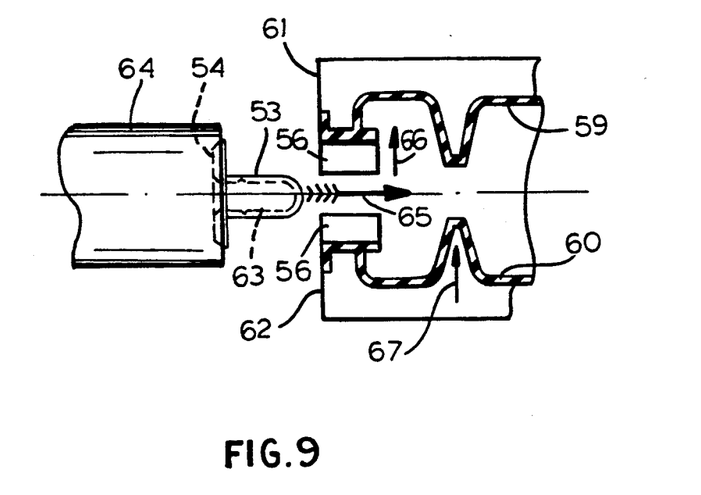
FIG. 9 is an illustration of steps in the process.
Figure 10:
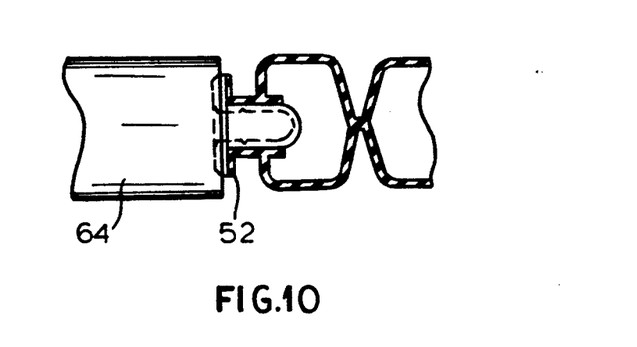
FIG. 10 is an illustration of a subsequent phase in the process.

As can be seen from FIG. 8, the casing 51, which is formed unitarily with the inner sole, is constituted from the butyl rubber from which the inner sole is vulcanized with two semicylindrical casing halves 56 which are brought together in the median plane 40 when the upper and lower inner sole halves 59 and 60 are brought together (compare FIGS. 9 and 10).

As described in my aforementioned copending application, the upper and lower halves 59 and 60 are molded, e.g. from butyl rubber, the butyl rubber having been injected or laid in in sheets. The molding takes place between an upper mold part 61 and a lower mold part 62 and respective sides of an intermediate mold part (not shown) which is withdrawn after the molding of the upper and lower halves has been completed. The valve housing tube 53, on a stem 63 of an inserter 64 is moved laterally into position as represented by the arrow 65.

To locate the tube 53 in the path of the casing halves 56. The inserter 64 is then moved upwardly (arrow 66) to seat the tube 63 in the upper casing half 56 without disturbing the latter. The lower mold part 62 is then raised (arrow 67) to close the casing halves on one another and permit vulcanization. The closed condition is represented in FIG. 10 and it can be seen that the ring 54 is also positioned against the flange 52 and the tube 63 for the vulcanization by the positioner 64. As the molding is closed, slight pressure is applied through the tube 53 and when the mold is fully closed full compressed air pressure is applied for the duration of the vulcanization process (see the aforementioned copending application).

At the conclusion of the vulcanization process, the inner sole is inserted into the compartment and the tubular formation passed through the holes 70 and 71 in the peripheral wall 17 and the lug 23 as described, whereupon the plug 55 is inserted.

Figure 11:
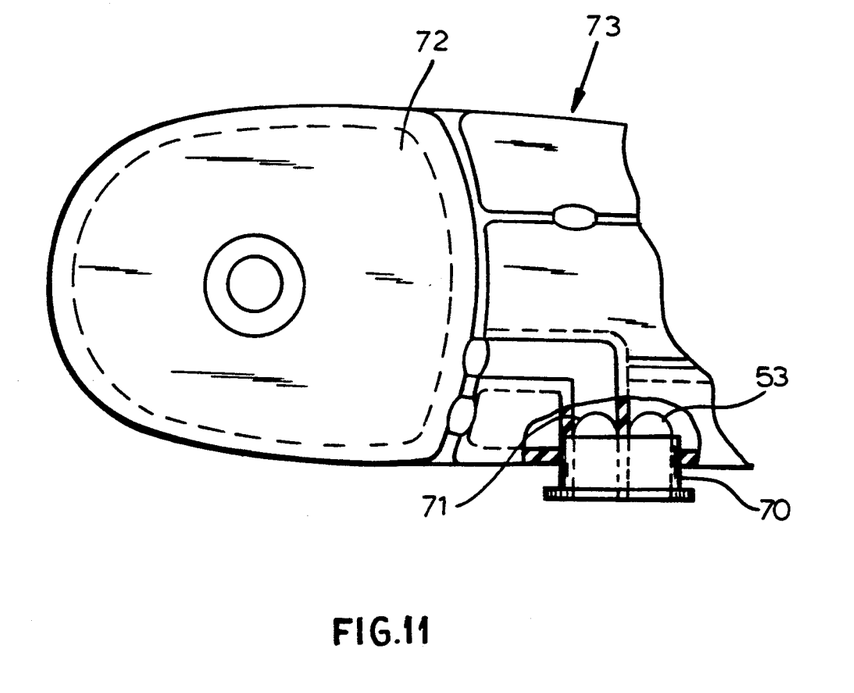
FIG. 11 is a fragmentary view similar to FIG. 4 illustrating another embodiment of the invention.

In FIG. 11, the tubular formation 70 has not only the valve housing tube 53 as previously described and, when mounted in the shoe, the respective checkvalve plug 55 is inserted. In addition, however, the formation 70 has another tube 71 which can receive a check valve 55 for pressurizing the heel portion 72 of the inner sole 73 independently of the pressurization of the remainder of the inner sole through the valve within the tube 53, otherwise the inner tube has the construction shown in FIG. 4.

Figure 12:
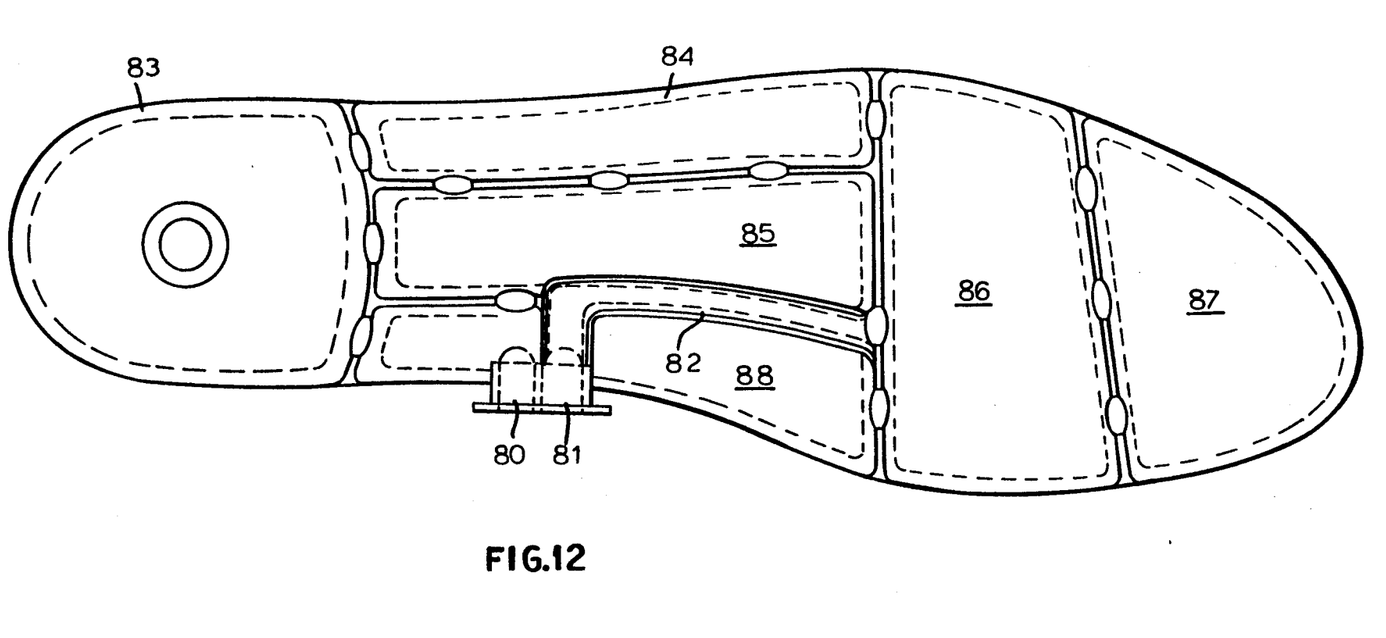
FIG. 12 is a plan view of the insole showing a two-valve arrangement for separately pressurizing the heel and part of the shank on the one hand and the remainder of the shank and the sole portions on the other.

In FIG. 12 I have shown a system in which the valve 80 can pressurize the heel portion 83 and the shank portions 84 and 85 while the shank portion 88 and the sole portions 86 and 87 of the insole are pressurized through valve 81 within the same valve formation as valve 80 but via a passage 82.

In general, therefore, I can provide as many valves as may be desirable for individual pressurization of any of the heel, shank and sole portions or parts thereof, or any combinations thereof.

I claim:

1. An athletic shoe comprising:
   an athletic shoe sole having a plate embedded therein over substantially an entire length of said sole, and a raised rim extending all around a periphery of said sole and molded unitarily therewith, said rim having an upwardly extending formation on one side of said sole;
   an athletic shoe upper affixed to said rim of sole around said periphery thereof, said upper and said sole defining a compartment between them extending substantially a full length and width of said sole, said compartment having a peripheral wall bounded by said rim, said formation overlying said wall;
   a hollow flexible inner sole received in said compartment and having a heel portion, a shank portion, a foot-ball portion and a toe portion, said inner sole further having a flexible valve element extending laterally thereof through said wall and said formation and forming the only location at which said inner sole is anchored in said compartment, said inner sole being freely movable within said compartment except at said element; and at least one checkvalve in said valve formation permitting fluid pressurization of an interior of said inner sole.

2. The athletic shoe defined in claim 1 wherein said inner sole is formed with transverse hinge webs interconnecting said foot-ball portion and said toe portion, said foot-ball portion and said shank portion, and said heel portion and said shank portion, at least said hinge webs interconnecting said foot-ball portion with said toe portion and said foot-ball portion with said shank portion having passages for fluid communication therebetween.

3. The athletic shoe defined in claim 2 wherein said inner sole is formed with at least two checkvalves, one of said checkvalves communicating with said heel portion, the other of said checkvalves communicating with said shank portion, said foot-ball portion and said toe portion.

4. The athletic shoe defined in claim 2 wherein said transverse hinge web interconnecting said heel portion with said shank portion is formed with a passage for fluid communication therebetween.

5. The athletic shoe defined in claim 2 wherein said shank portion is subdivided transversely into at least two longitudinal sections interconnected by a flexible longitudinal web having a passage for fluid communication therebetween.

6. The athletic shoe defined in claim 2 wherein said shank portion has three longitudinal sections and two flexible longitudinal webs interconnecting said sections.

7. The athletic shoe defined in claim 2 wherein said inner sole is formed from two halves molded from an elastomeric material and bonded in a median plane of said inner sole.

8. The athletic shoe defined in claim 7 wherein each of said halves is formed with a central depression at said heel portion formed by an inwardly extending hollow post of said material, said posts being bonded together in said plane.

9. The athletic shoe defined in claim 7 wherein each of said halves is formed on a lateral wall of said inner sole with a semicylindrical casing aligned with the casing of the other half and receiving a valve-housing tube between them to constitute said element.

10. A method of making an athletic shoe, comprising the steps of:
forming a hollow flexible inner sole having a heel portion, a shank portion, a foot-ball portion and a toe portion;
retaining said inner sole in a compartment formed by attaching an athletic shoe upper to an athletic shoe sole along a peripheral wall of said compartment by introducing a flexible valve formation laterally through said wall and forming the only location at which said inner sole is anchored in said compartment, said inner sole being freely movable within said compartment except at said valve formation; and
thereafter inserting two checkvalves in said valve formation permitting fluid pressurization of an interior of said inner sole, said inner sole being formed with transverse hinge webs interconnecting said foot-ball portion and said toe portion, said foot-ball portion and said shank portion, and said heel portion and said shank portion, at least said hinge webs interconnecting said foot-ball portion with said toe portion and said foot-ball portion with said shank portion having passages for fluid communication therebetween, one of said checkvalves communicating with said heel portion, the other of said checkvalves communicating with at least one of said shank portion, said foot-ball portion and said toe portion, said sole being assembled from an outer member and an inner member formed with said peripheral wall.

11. The method defined in claim 10 wherein said inner sole is formed with transverse hinge webs interconnecting said foot-ball portion and said toe portion, said foot-ball portion and said shank portion, and said heel portion and said shank portion, at least said hinge webs interconnecting said foot-ball portion with said toe portion and said foot-ball portion with said shank portion having passages for fluid communication therebetween.

12. The method defined in claim 11 wherein at least two checkvalves are inserted in said formation, one of said checkvalves communicating with said heel portion, the other of said checkvalves communicating with said shank portion, said foot-ball portion and said toe portion.

13. The method defined in claim 10 wherein said transverse hinge web interconnecting said heel portion with said shank portion is formed with a passage for fluid communication therebetween.

14. The method defined in claim 10 wherein said inner sole is formed from two halves molded from an elastomeric material and bonded in a median plane of said inner sole.

15. The method defined in claim 14 wherein each of said halves is formed with a central depression at said heel portion formed by an inwardly extending hollow post of said material, said posts being bonded together in said plane.

16. The method defined in claim 14 wherein each of said halves is formed on a lateral wall of said inner sole with a semicylindrical casing aligned with the casing of the other half and receiving a valve-housing tube between them to constitute said formation, said casings being vulcanized to said valve-housing tube.

17. The method defined in claim 16 wherein said inner sole is formed from two halves molded from an elastomeric material and bonded in a median plane of said inner sole by simultaneously molding an upper half between an upper mold part stationary on a molding machine and an intermediate mold part thereof, and a lower half in alignment with said upper half between a vertically movable lower mold part and said intermediate mold part, withdrawing said intermediate mold part from between said upper and lower mold parts, laterally introducing a valve-housing tube between said halves and raising said valve-housing tube into the casing on said half on said upper part, raising said lower part to press said halves together and close said casings on said valve-housing tube, lightly pressurizing an interior of said inner sole as said halves are pressed together, fully pressurizing said inner sole and vulcanizing said halves together, and thereafter depressurizing said inner sole to atmospheric pressure through said valve-housing tube and removing said inner sole from said molding machine.

18. The method defined in claim 17, further comprising molding said sole and embedding at least one metal plate having a thickness of at most 0.3 mm therein.

19. The method defined in claim 17 wherein said upper is stitched to said sole to define said compartment.

20. The method defined in claim 17, further comprising assembling said sole from an outer member and an inner member formed with said peripheral wall.

* * * * *